(12) United States Patent
Zhu et al.

(10) Patent No.: US 9,711,789 B2
(45) Date of Patent: Jul. 18, 2017

(54) SUPERCRITICAL CONTINUOUS HYDROTHERMAL SYNTHESIS OF LITHIUM TITANATE ANODE MATERIALS FOR LITHIUM-ION BATTERIES

(71) Applicant: Hefei Guoxuan High-Tech Power Energy Co., Ltd., Hefei, Anhui (CN)

(72) Inventors: Wenting Zhu, Anhui (CN); Maoping Yang, Anhui (CN); Xulai Yang, Anhui (CN); Xiaoming Xu, Anhui (CN); Jia Xie, Lake Jackson, TX (US); Zhen Li, Anhui (CN)

(73) Assignee: Hefei Guoxuan High-Tech Power Energy Co., Ltd., Hefei, Anhui (CN)

( * ) Notice: Subject to any disclaimer, the term of this patent is extended or adjusted under 35 U.S.C. 154(b) by 0 days.

(21) Appl. No.: 13/969,359

(22) Filed: Aug. 16, 2013

(65) Prior Publication Data
US 2014/0105811 A1    Apr. 17, 2014

(30) Foreign Application Priority Data
Oct. 12, 2012  (CN) .......................... 2012 1 0385211

(51) Int. Cl.
  *C01G 23/00*  (2006.01)
  *H01M 4/485*  (2010.01)
  *C01D 15/02*  (2006.01)
  *H01M 10/0525*  (2010.01)

(52) U.S. Cl.
  CPC ............ *H01M 4/485* (2013.01); *C01D 15/02* (2013.01); *C01G 23/005* (2013.01); *C01P 2002/72* (2013.01); *H01M 10/0525* (2013.01); *Y02P 20/544* (2015.11)

(58) Field of Classification Search
  CPC ..................................................... C01G 23/005
  USPC ............................................. 423/598, 594.15
  See application file for complete search history.

(56) References Cited

U.S. PATENT DOCUMENTS

2011/0021745 A1*  1/2011  Santra et al. ................. 530/322
2012/0202120 A1*  8/2012  Kim et al. ................. 429/231.1
2013/0316087 A1*  11/2013  Ahn et al. ..................... 427/487

* cited by examiner

*Primary Examiner* — Matthew E Hoban
*Assistant Examiner* — James Fiorito
(74) *Attorney, Agent, or Firm* — Osha Liang LLP (57) ABSTRACT

A method for synthesizing lithium titanate includes preparing a supercritical fluid from water; reacting a solution containing lithium and titanium with the supercritical fluid under a condition that maintains the supercritical fluid in its supercritical state to produce a reaction mixture comprising the lithium titanate; and collecting the lithium titanate. The supercritical fluid is prepared at a temperature of 375-500° C. and a pressure of 22-35 MPa. The solution containing lithium and titanium is prepared by mixing a solution containing lithium, prepared by dissolving a lithium source in a selected solvent, and a solution containing titanium, prepared by dissolving a titanium source in the selected solvent, wherein a molar ratio of lithium:titanium is between 4.0:5.0 and 4.5:5.0. The lithium source is lithium hydroxide, lithium carbonate, lithium acetate, lithium oxalate, lithium nitrate, or lithium oxide, and the titanium source is tetrabutyl titanate.

16 Claims, 6 Drawing Sheets

SUPERCRITICAL CONTINUOUS HYDROTHERMAL SYNTHESIS OF LITHIUM TITANATE ANODE MATERIALS FOR LITHIUM-ION BATTERIES

CROSS REFERENCE TO RELATED APPLICATIONS

This claims the priority of Chinese application No. 201210385211.2, filed on Oct. 12, 2012. The disclosure of this prior application is incorporated by reference in its entirety.

FIELDS OF THE INVENTION

The present invention relates to lithium-ion battery materials, particularly to the methods for supercritical continuous hydrothermal synthesis of lithium titanate anode materials.

BACKGROUND

Energy and environment are two critical issues we face in the 21st century. On the one hand, our daily lives and productivities are becoming more dependent on energy. This dependence will conflict with limited world oil reserves and increasing scarcity of supply. Recent surges in the international oil prices reflect lack of confidence in the future energy supply. On the other hand, the excessive use of fossil fuels causes global environmental pollution and climate changes. This further threatens the environment for human survival. Therefore, the development of clean renewable energy is one of the key technologies that would have the most impact on future world economy.

Energy is lifeblood of a nation's economy. Therefore, it is very important to carry out research and development for new energy materials and technology, and to actively search for clean renewable alternative energies. Currently, there is global enthusiasm in the research and development of new energy materials and technologies, focusing on the use of solar energy, fuel cells, lithium-ion batteries and supercapacitors. Among these, lithium-ion battery material technology has matured, and a sizeable market for such materials is rapidly forming.

Lithium-ion batteries entered the market in 1990s as a new generation of environmentally friendly batteries. Due to their unique properties of high operating voltages, low self-discharge rates, small sizes, light weights, and no memory effects, lithium-ion batteries are widely used as ideal power sources in the miniaturization of electronic devices, such as cameras, mobile phones, laptop computers, and portable measurement instruments. Lithium-ion batteries are also the preferred choice for use as light-weight, high-capacity power sources in future electric vehicles. In this regard, the cathode material of a lithium-ion battery is a key factor that can limit the overall performance of the battery.

The first commercial lithium-ion battery anode materials are mostly carbon or graphite materials. However, after the first charge and discharge, carbon and graphite would form a passivation film in the surface carbon layer, resulting in a loss of capacity. In addition, the potential of the carbon electrode and the potential of lithium are very close. When the battery is overcharged, lithium metal may precipitate on the surface of the carbon electrode, forming surface dendrites that can cause safety concerns.

In contrast, as anode materials for lithium-ion batteries, spinel $Li_4Ti_5O_{12}$ does not have such problems. $Li_4Ti_5O_{12}$ maintains high degree of structural stability during lithium ion intercalation and de-intercalation. It maintains the same spinel structure before and after lithium-ion intercalation, and it shows little changes in the crystal lattice parameters. Thus, the volume change is very small, and, therefore, $Li_4Ti_5O_{12}$ is known as a "zero strain" electrode material.

As compared with carbon anode materials, which currently hold the largest market share, $Li_4Ti_5O_{12}$ has a higher equilibrium potential, which can avoid the deposition of lithium metal, thereby avoiding dendrite formation and the hazards associated with dendrite formation. In addition, its platform capacity is more than 85% of the total capacity. Towards the end of a charging cycle, the potential rises rapidly, which can be readily used to indicate charge completion to avoid over-charging. Therefore, it has less safety concerns than the carbon anode materials.

$Li_4Ti_5O_{12}$ has higher currents in charge and discharge performance and can be used as anode materials, together with $LiCoO_2$, $LiNiO_2$ or $LiMn_2O_4$, and activated carbon, etc., to form lithium ion batteries, all solid-state batteries, and hybrid super capacitors. It exhibits good application properties. At the same time, $Li_4Ti_5O_{12}$ also has the advantageous properties of being resistant to over-charging, good thermal stability, and good safety performance. It has a wide range of applications in the field of electric vehicles, hybrid vehicles, and energy storage batteries.

However, $Li_4Ti_5O_{12}$ itself has poor conductivity and does not have good performance in high-rate charge-discharge specific capacity. This greatly limits the applications of this material in lithium-ion batteries. Therefore, it is necessary to be modified this material to improve its electrical conductivity in order to improve its high-rate performance. At the same time, it is also necessary to maintain its high reversible capacity and good cycle stability, and to achieve the goal of cost.

Many methods are available for the synthesis of $Li_4Ti_5O_{12}$. Common methods use solid-state reactions or the sol-gel method. The solid-state process is simple and easy to scale up. However, the drawback with the solid-state method is that the particle sizes of the products are difficult to control, and most are micron-sized particles with poor homogeneity. These are not conducive to high-current charge and discharge, and the high rate performance of such materials is poor. The sol-gel method requires addition of organic compounds, which increase the costs, and the process is complex. It would be difficult to achieve large-scale industrial production to meet the demand in the energy field with the sol-gel method.

Supercritical continuous hydrothermal synthesis (SHS) is a promising oxide preparation method. The products are of good quality and have high degree of crystallinity, and the particles are nanoscale particles. This method has the advantages of being environmentally friendly, fast and sustainable, etc. The method has been used to synthesize nano-metal oxides, including $CeO_2$, $AlOOH$, $Fe_2O_3$, $TiO_2$, $CuO$, and $ZnO$, as well as a number of complex metal oxides. The solubilities of the starting reactants for such syntheses are typically low. In supercritical water, the reaction materials disperse better, resulting in higher reaction rates. As a result, the products are of good qualities and are smaller particles in the nanoscale. The SHS method has been used in the preparation of cathode materials for lithium batteries. However, the use of supercritical continuous hydrothermal synthesis method to prepare lithium titanate anode material has not been reported.

SUMMARY OF THE INVENTION

Embodiments of the invention relate to methods for preparing lithium titanate anode materials. Methods of the invention use supercritical continuous hydrothermal synthesis and control the flow rates of the reagents to achieve the preparation of nano-scale lithium titanate anode materials with improved high-rate capability and cycling performance. The products thus obtained have small particles with high crystallinity, high specific capacity, and good safety performance characteristics. In addition, the preparation processes are easy to control.

In one aspect, embodiments of the invention relate to methods for synthesizing lithium titanate includes preparing a supercritical fluid from water; reacting a solution containing lithium and titanium with the supercritical fluid under a condition that maintains the supercritical fluid in its supercritical state to produce a reaction mixture comprising the lithium titanate; and collecting the lithium titanate. The supercritical fluid may be prepared at a temperature of 375-500° C. and a pressure of 22-35 MPa.

In accordance with some embodiments, the solution containing lithium and titanium may be prepared by mixing a solution containing lithium, which is prepared by dissolving a lithium source in a selected solvent, and a solution containing titanium, which is prepared by dissolving a titanium source in the selected solvent. The molar ratio of lithium:titanium may be between 4.0:5.0 and 4.5:5.0, preferably (4.0-4.2):5.0, more preferably about 4.2:5.0.

In accordance with some embodiments of the invention, the lithium source may be selected from lithium hydroxide, lithium carbonate, lithium acetate, lithium oxalate, lithium nitrate, lithium oxide, or a combination thereof. In accordance with embodiments of the invention, the titanium source may be tetrabutyl titanate.

Another aspect of the invention relate to lithium titanate materials prepared with a method described above.

Another aspect of the invention relate to lithium-ion batteries containing an anode made of the lithium titanate materials prepared by a method described above.

In accordance with an exemplary embodiment of the invention, a method of the present invention for preparing lithium titanates may include the following steps:

A. Preparation of Supercritical Water:
1) Add an appropriate amount of deionized water into a reactant container L1, and flush with nitrogen for an appropriate amount of time (for example, 1 h);
2) Use a high-pressure pump P to pump the deionized water into a reactor R (which may be a tubular reactor, which may be made of a stainless steel), and control the furnace to preheat the deionized water, so that the pressure is at about 22~30 MPa (preferably about 25 MPa) and the temperature is controlled at about 375~500° C., preferably about 375~450° C., more preferably about 400° C. The water flow rate may be controlled at about 5~25 g/min, preferably about 9~18 g/min.

B. Preparation of Lithium Titanate:
1) Based on a molar ratio of Li:Ti of about (4.0-4.2):5.0 (preferably about 4.2:5.0), weight appropriate amounts of a lithium compound and tetrabutyl titanate, and separately dissolve each in ethanol in reactant containers L2 and L3, respectively. Pass nitrogen into the solutions for an appropriate amount of time (for example, 1 h) to expel the dissolved oxygen;
2) Use a high-pressure pump P to pump the precursor solutions into a blender M to premix them; control the flow rates of the precursor solutions in an appropriate range (for example, about 1.7~3.0 g/min);
3) Transfer the mixture into a reactor R to start the reaction. The reactor is controlled under a condition that would maintain the supercritical fluid of water in a supercritical state, e.g. at a temperature of about 375° C.-450° C., preferably about 400±5° C., and a pressure of about 22-30 MPa, preferably around 25 MPa.
4) After completion of the reaction, the mixture is cooled in a cooling device C to room temperature, and filtered through a metal filter F.
5) The product may be purified with deionized water, dispersed with ultrasound, and centrifuged (for example at 3000 rpm for 30 min), followed by drying (for example, at 60° C. in vacuum for 24 hours), to afford the lithium titanate product.

The above-mentioned lithium source may be lithium carbonate, lithium hydroxide, lithium acetate, lithium oxalate, lithium nitrate, lithium oxide or a combination thereof.

Other aspects and advantages of the invention will be apparent from the following description and the appended claims.

DETAILED DESCRIPTION

Embodiments of the invention relate to methods for preparing lithium titanate anode materials for lithium ion batteries. Lithium ion batteries with lithium titanate as anode materials have several advantages that enable these batteries to be used in many applications, such as electric vehicles because these batteries can be charged in a relatively short durations without the dangers (e.g., dendrite formation) associated with conventional carbon-based materials.

The use of lithium titanate as an anode material is advantageous because it increases the surface area of the anode, thereby allowing the electrons to enter and exit the anode quickly. This increase in the surface area allows the lithium-titanate batteries to be recharged quickly and provide high currents when necessary.

As noted above, many methods are available for the synthesis of spinel $Li_4Ti_5O_{12}$. One common method use solid-state reactions. Although the solid-state process is simple and easy to scale up, the particle sizes of the products thus produced are difficult to control, and most are micron-sized particles with poor homogeneity, which are not conducive to high-current charge and discharge. Furthermore, the high rate performance of such materials is poor.

The other common method is the sol-gel method. However, the sol-gel methods require addition of organic compounds, which increase the costs and complexity of the process. Therefore, it would be difficult to achieve large-scale industrial production with the sol-gel method.

Methods of the invention use supercritical continuous hydrothermal synthesis, in which the flow rates of various solutions may be controlled to achieve the preparation of nano-lithium titanate anode materials with improved high-rate capability and cycling performance. The products thus obtained have small particles (e.g., on the nanometer scales) with high crystallinity, high specific capacity, and good safety performance characteristics. In addition, the preparation processes are easy to control.

A supercritical fluid is a substance at a temperature and pressure above its critical point, where distinct liquid and gas phases do not exist. Instead, a mixed liquid-gas properties may be realized. For example, a supercritical fluid may effuse through solids like a gas. At the same time, it may be able to dissolve materials like a liquid. In supercritical hydrothermal synthesis, water is used to produce the supercritical fluid at a temperature and pressure above the critical point of water. With water, the supercritical fluid occurs above 374° C. and 22.064 MPa.

In accordance with embodiments of the invention, supercritical hydrothermal synthesis may be carried out at a temperature higher than 374° C., such as about 375-500° C., preferably about 375-450° C., more preferably about 375-425° C., and most preferably around 400° C., and at a pressure of greater than 22 MPa, such as about 23-40 MPa, preferably about 23-35 MPa, more preferably about 23-30 MPa, and most preferably around 25 MPa. Note that any numerical range disclosed in this description is intended to include all numbers within the range (inclusive of the lower and upper limits), as if each number had been explicitly disclosed.

In accordance with embodiments of the invention, spinel $Li_4Ti_5O_{12}$ may be prepare using lithium salts and titanium salts as the starting materials in a supercritical hydrothermal synthesis. Any suitable lithium and titanium sources may be used with embodiments of the invention. For example, the titanium source may be any suitable titanium compounds, such as tetrabutyl titanate, tetraethyl titanate, titanium isopropoxide, etc. The lithium source may be any suitable lithium compounds or salts, such as lithium hydroxide, lithium carbonate, lithium acetate, lithium oxalate, lithium nitrate, lithium oxide, etc.

The molar ratio of lithium (Li) to titanium (Ti) in the spinel $Li_4Ti_5O_{12}$ may be about 4:5. In accordance with embodiments of the invention, a slight excess of lithium ion may be used in the supercritical hydrothermal synthesis. For example, the molar ratio of Li:Ti may be slightly more than 4.0 to 5.0, such as about 4.1 to 5.0 or about 4.2 to 5.0.

In accordance with embodiments of the invention, the lithium source and titanium source starting materials may be dissolved in a suitable solvent for reaction in the water supercritical fluid. Examples of suitable solvent may include organic solvents that are compatible with the supercritical fluid prepared from water, such as alcohols, which are preferably small alkyl alcohols. Preferred examples of alcohols may include methanol, ethanol, propanol, butanol, etc.

In accordance with embodiments of the invention, supercritical fluid of water is prepared before start of the reaction. A separate reactor may be used for the formation of the supercritical fluid, which is then introduced into the reaction chamber. Similarly, the lithium source and titanium source reactants may be dissolved in separate containers prior to the reaction. In preferred embodiments of the invention, the lithium source and the titanium source may be first dissolved in separate containers, and then these solutions are premixed to form a precursor prior to introduction of the supercritical fluid. The various reaction fluids may be introduced or pumped using a suitable device, such as high-pressure pumps. The reaction products may be collected by filtration or other suitable means (e.g., centrifugation).

Figure 1:
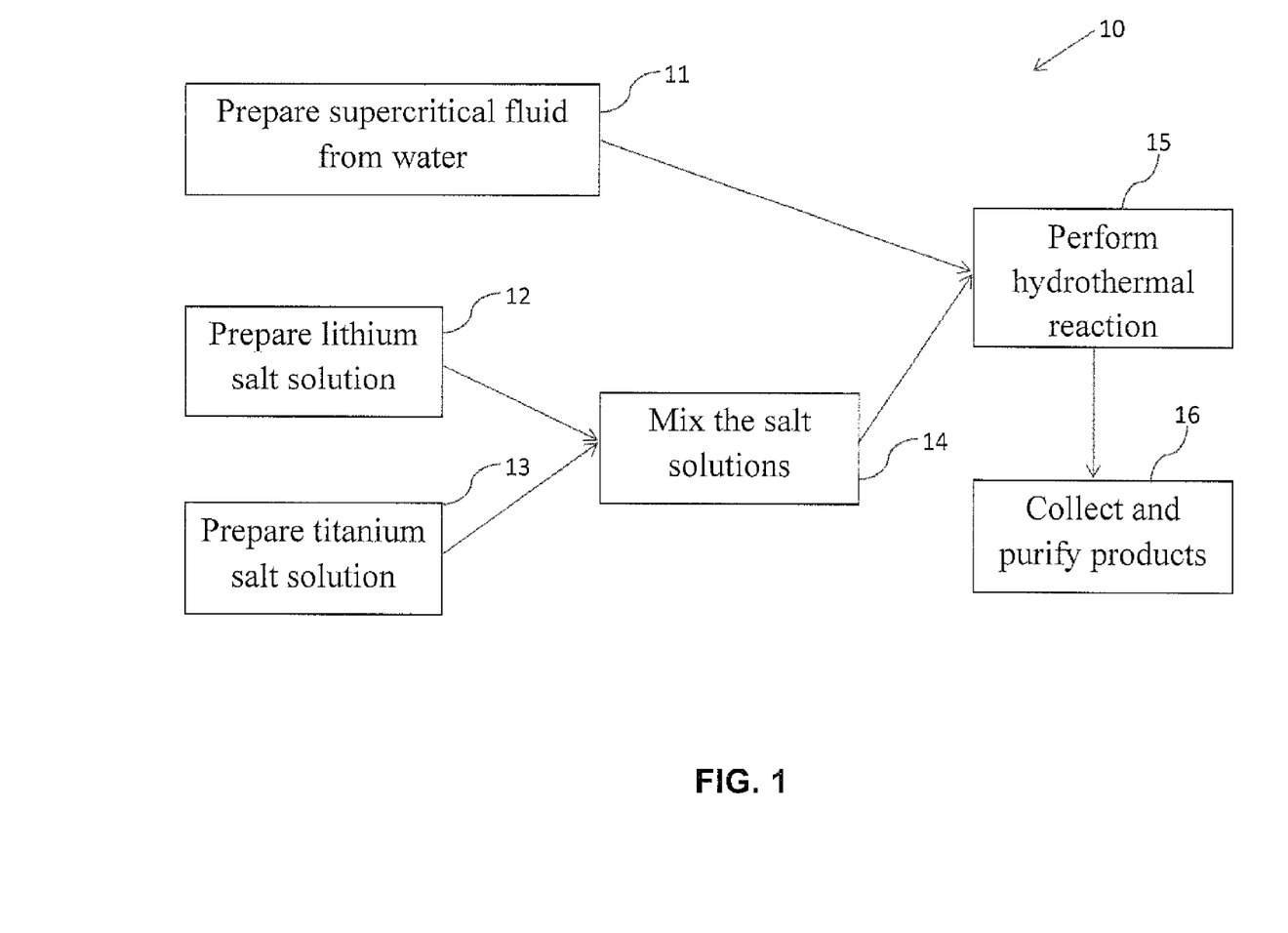
FIG. 1 shows a flowchart illustrating one method in accordance with one embodiment of the invention.

FIG. 1 shows a flowchart illustrating one method of the invention. As shown in FIG. 1, a method 10 may comprise preparing a supercritical fluid from water (step 11), preparing a lithium salt solution (step 12), and preparing a titanium salt solution (step 13). Then, the lithium salt solution is mixed with the titanium salt solution (step 14) prior to the hydrothermal reaction (step 15). In accordance with some embodiments of the invention, steps 12-14 may be performed together by mixing both lithium alt and titanium salt in one container. The products formed from the hydrothermal reaction may be collected and purified using any appropriate means (step 16), such as filtration or centrifugation.

These reactions may be performed with any suitable setups. For example, FIG. 2 shows one example of a system (or setup) that may be used to carry out a method of the invention for the synthesis of spinel $Li_4Ti_5O_{12}$.

Figure 2:
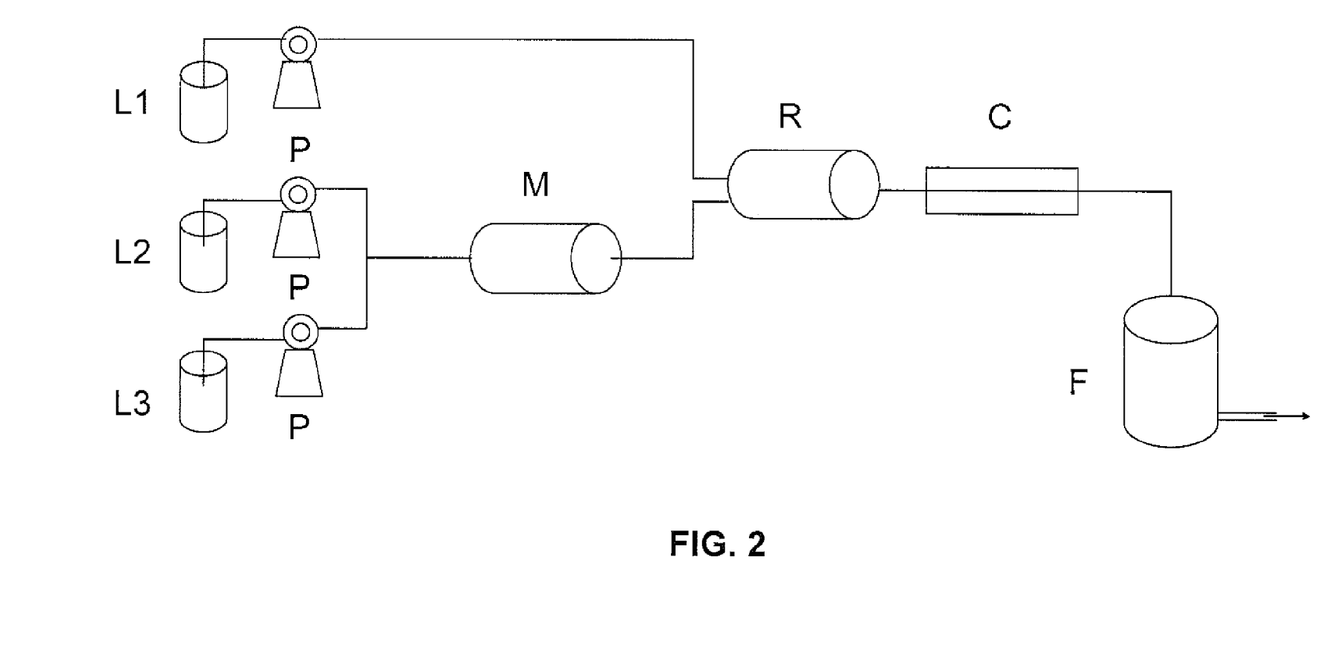
FIG. 2 shows a supercritical hydrothermal synthesis device in accordance with one embodiment of the invention.

As shown in FIG. 2, the starting material container L1 may be used to prep water for supercritical fluid formation. The starting material containers L2 and L3 may be used to prepare the lithium compound solution and the titanium compound solution, respectively. The solutions from L2 and L3 may be pumped by a high pressure pump P into a mixer M to premix the two salt solutions. The premixed solution is pushed into the reactor R, where the supercritical fluid from container L1 is formed. The three pumps are shown as identical pump P. However, in other embodiments, these may be different pumps. In addition, in some embodiments, the lithium and titanium salts may be mixed in one container, as noted above.

The reactor R may be a tubular reactor (or any other suitable reactor). The reactor R may be made of any suitable material, such as stainless steel (e.g., 316 SS). Within the tubular reactor R, the mixture and the supercritical fluid may react while they are pushed down the tubular reactor R. The products would emerge from the other end of the tubular reactor R. The product stream from the reactor R is allowed to cool to a lower temperature (e.g., room temperature), for example in a cooling device C. The cooled product may be collected by filtration through a filter F or by centrifugation. The filter F may be any suitable filter, such as a metal filter or a polymer filter.

The collected product may be further purified by any suitable methods. For example, the products may be re-suspended in water and mixed (e.g., by ultrasound agitation). Then, the product particles may be collected by filtration or centrifugation.

The following examples illustrate embodiments of the invention for the preparation of spinel $Li_4Ti_5O_{12}$. One skilled in the art would appreciate that these examples are for illustration only and that variations and modifications of these examples are possible without departing from the scope of the invention.

Example 1

Add an appropriate amount (for example, 1000 ml) of deionized water into a reactant container (shown as L1 in FIG. 2), and flush with nitrogen for 1 h. Use a high-pressure pump (shown as P in FIG. 2) to pump the deionized water into a reactor (shown as R in FIG. 2), and preheat the deionized water with a furnace. Control the pressure is at about 25 MPa and the temperature at about 400° C. The water flow rate is controlled at about 9 g/min.

Based on a molar ratio of Li:Ti (e.g., 4.2:5), weight appropriate amounts of lithium hydroxide and tetrabutyl titanate (for example, 4.02 g of lithium hydroxide and 68.06 g of tetrabutyl titanate), which are separately dissolve in ethanol (e.g., 500 ml) in reactant containers (shown as L2 and L3 in FIG. 2). Pass nitrogen into the solutions for 1 h to expel the dissolved oxygen.

Use a high-pressure pump (shown as P in FIG. 2) to pump the precursor solutions into a blender or mixer (shown as M in FIG. 2) to premix them. Control the flow rates of the precursor solutions at about 1.7 g/min. Transfer the solutions into a reactor (shown as R in FIG. 2) to carry out the reaction. The reactor temperature is controlled at about 400° C., and the pressure is controlled at about 25 MPa.

After completion of the reaction, the mixture may be cooled in a cooling device (shown as C in FIG. 2) to room temperature, and filtered through a metal filter (shown as F in FIG. 2). The product may be purified with deionized water, dispersed with ultrasound, and centrifuged at 3,000 rpm for 30 min, followed by drying (e.g., at 60° C.) in vacuum for a duration (e.g., 24 hours), to afford the lithium titanate product.

Figure 3:
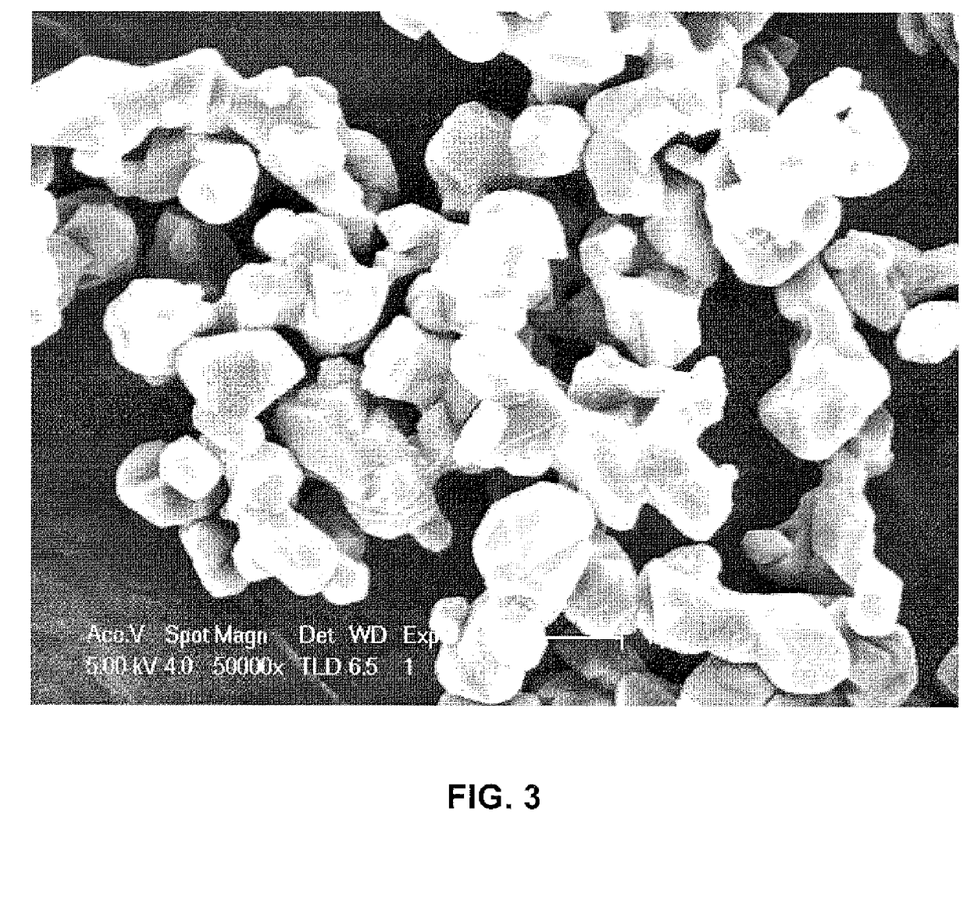
FIG. 3 shows surface morphology of nano-lithium titanate prepared according to Example 1 of the invention.
Figure 4:
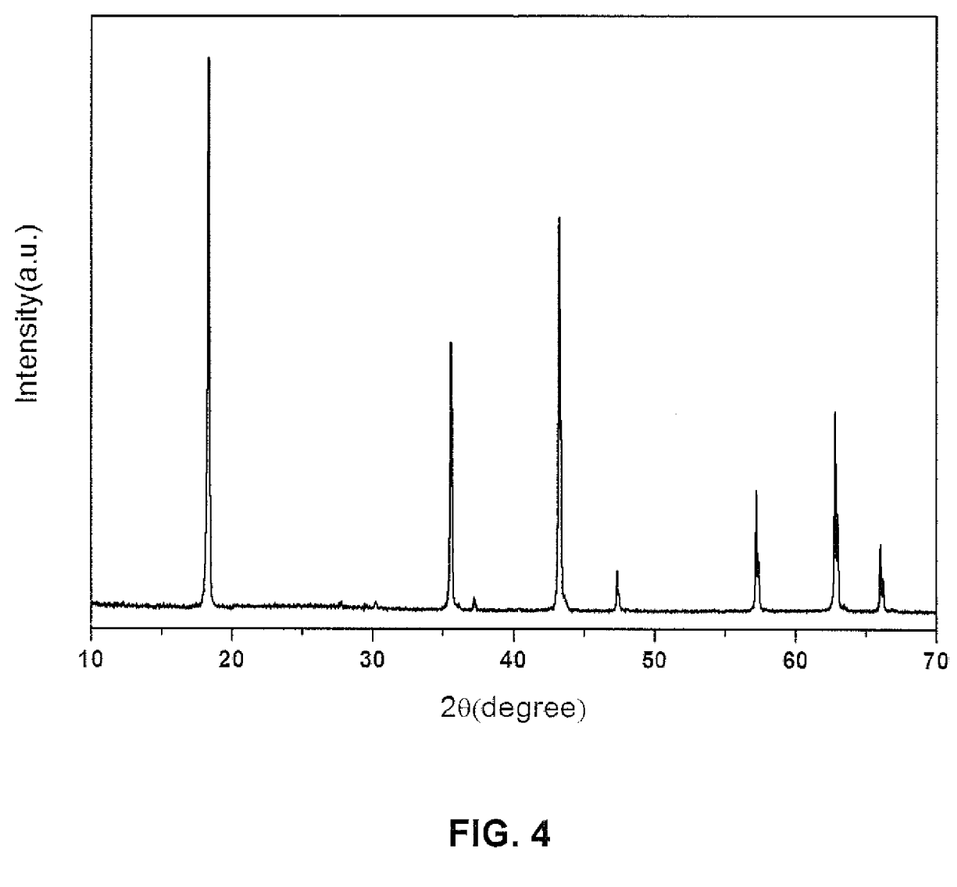
FIG. 4 shows an X-ray diffraction pattern of lithium titanate prepared according to Example 1 of the invention.

The surface shapes of the product are shown in FIG. 3, which shows that the lithium titanate is produced as nanoparticles. The X-ray diffraction ($\lambda_K$ of a Copper source; 2θ scan) pattern of this product is shown in FIG. 4, which did not show any apparent peak of impurity. Instead, the 2θ scan shows distinct peaks at about 20°, 36°, 43°, 47.5°, 20°, 57.5°, 63°, and 66°, indicating that the product is a pure lithium titanate.

Example 2

Add an appropriate amount (for example, 1000 ml) of deionized water into a raw material container (shown as L1 in FIG. 2), and flush with nitrogen for 1 h. Use a high-pressure pump (shown as P in FIG. 2) to pump the deionized water into a reactor (shown as R in FIG. 2), and pre-heat the deionized water with a furnace. Control the pressure at about 25 MPa and the temperature at about 400° C. The water flow rate is controlled at about 9 g/min.

Based on a molar ratio of Li:Ti (e.g., 4.2:5), weight appropriate amounts of lithium hydroxide and tetrabutyl titanate (for example, 6.35 g of lithium hydroxide and 102.10 g of tetrabutyl titanate), which are separately dissolve in ethanol (e.g., 500 ml) in reactant containers (shown as L2 and L3 in FIG. 2). Pass nitrogen into the solutions for 1 h to expel the dissolved oxygen.

Use a high-pressure pump (shown as P in FIG. 2) to pump the precursor solutions into a blender or mixer (shown as M in FIG. 2) to premix them. Control the flow rates of the precursor solutions at about 3.0 g/min. Transfer the solutions into a reactor (shown as R in FIG. 2) to carry out the reaction.

After completion of the reaction, the mixture is cooled to room temperature, and filtered through a metal filter (shown as F in FIG. 2). The product is purified with deionized water, dispersed with ultrasound, and centrifuged at 3,000 rpm for 30 min, followed by drying (e.g., at 60° C.) in vacuum for 24 hours, to afford the lithium titanate product.

Example 3

Add an appropriate amount (for example, 1000 ml) of deionized water into a raw material container (shown as L1 in FIG. 2), and flush with nitrogen for 1 h. Use a high-pressure pump (shown as P in FIG. 2) to pump the deionized water into a reactor (shown as R in FIG. 2), and pre-heat the deionized water with a furnace. Control the pressure at about 25 MPa and the temperature at about 400° C. The water flow rate is controlled at about 18 g/min.

Based on a molar ratio of Li:Ti (e.g., 4.2:5), weight appropriate amounts of lithium hydroxide and tetrabutyl titanate (for example, 8.05 g of lithium hydroxide and 136.13 g of tetrabutyl titanate), which are separately dissolve in ethanol (e.g., 500 ml) in reactant containers (shown as L2 and L3 in FIG. 2). Pass nitrogen into the solutions for 1 h to expel the dissolved oxygen.

Use a high-pressure pump (shown as P in FIG. 2) to pump the precursor solutions into a blender or mixer (shown as M in FIG. 2) to premix them. Control the flow rates of the precursor solutions at about 1.7 g/min. Transfer the solutions into a reactor (shown as R in FIG. 2) to carry out the reaction.

After completion of the reaction, the mixture is cooled to room temperature, and filtered through a metal filter (shown as F in FIG. 2). The product is purified with deionized water, dispersed with ultrasound, and centrifuged at 3,000 rpm for 30 min, followed by drying at 60° C. in vacuum for 24 hours, to afford the lithium titanate product.

Example 4

Add an appropriate amount (for example, 500 ml) of deionized water into a raw material container (shown as L1 in FIG. 2), and flush with nitrogen for 1 h. Use a high-pressure pump (shown as P in FIG. 2) to pump the deionized water into a reactor (shown as R in FIG. 2), and pre-heat the deionized water with a furnace. Control the pressure at about 25 MPa and the temperature at about 400° C. The water flow rate is controlled at about 18 g/min.

Based on a molar ratio of Li:Ti of 4.05:5, weight appropriate amounts of lithium hydroxide and tetrabutyl titanate (for example, 3.88 g of lithium hydroxide and 68.06 g of tetrabutyl titanate), which are separately dissolve in ethanol (e.g., 500 ml) in reactant containers (shown as L2 and L3 in FIG. 2). Pass nitrogen into the solutions for 1 h to expel the dissolved oxygen.

Use a high-pressure pump (shown as P in FIG. 2) to pump the precursor solutions into a blender or mixer (shown as M in FIG. 2) to premix them. Control the flow rates of the precursor solutions at about 3 g/min. Transfer the solutions into a reactor (shown as R in FIG. 2) to carry out the reaction.

After completion of the reaction, the mixture is cooled to room temperature, and filtered through a metal filter F. The product is purified with deionized water, dispersed with ultrasound, and centrifuged at 3,000 rpm for 30 min, followed by drying at 60° C. in vacuum for 24 hours, to afford the lithium titanate product.

Example 5

Add an appropriate amount (for example, 500 ml) of deionized water into a raw material container (shown as L1 in FIG. 2), and flush with nitrogen for 1 h. Use a high-pressure pump (shown as P in FIG. 2) to pump the deionized water into a reactor (shown as R in FIG. 2), and pre-heat the deionized water with a furnace. Control the pressure at about 25 MPa and the temperature at about 400° C. The water flow rate is controlled at about 9 g/min.

Based on a molar ratio of Li:Ti (e.g., 4.15:5), weight appropriate amounts of lithium hydroxide and tetrabutyl titanate (for example, 3.98 g of lithium hydroxide and 68.06 g of tetrabutyl titanate), which are separately dissolve in ethanol (e.g., 1000 ml) in reactant containers (shown as L2 and L3 in FIG. 2). Pass nitrogen into the solutions for 1 h to expel the dissolved oxygen.

Use a high-pressure pump (shown as P in FIG. 2) to pump the precursor solutions into a blender or mixer (shown as M in FIG. 2) to premix them. Control the flow rates of the precursor solutions at about 1.7 g/min. Transfer the solutions into a reactor (shown as R in FIG. 2) to carry out the reaction.

After completion of the reaction, the mixture is cooled to room temperature, and filtered through a metal filter (shown as F in FIG. 2). The product is purified with deionized water, dispersed with ultrasound, and centrifuged at 3,000 rpm for 30 min, followed by drying at 60° C. in vacuum for 24 hours, to afford the lithium titanate product.

Example 6

Figure 5:
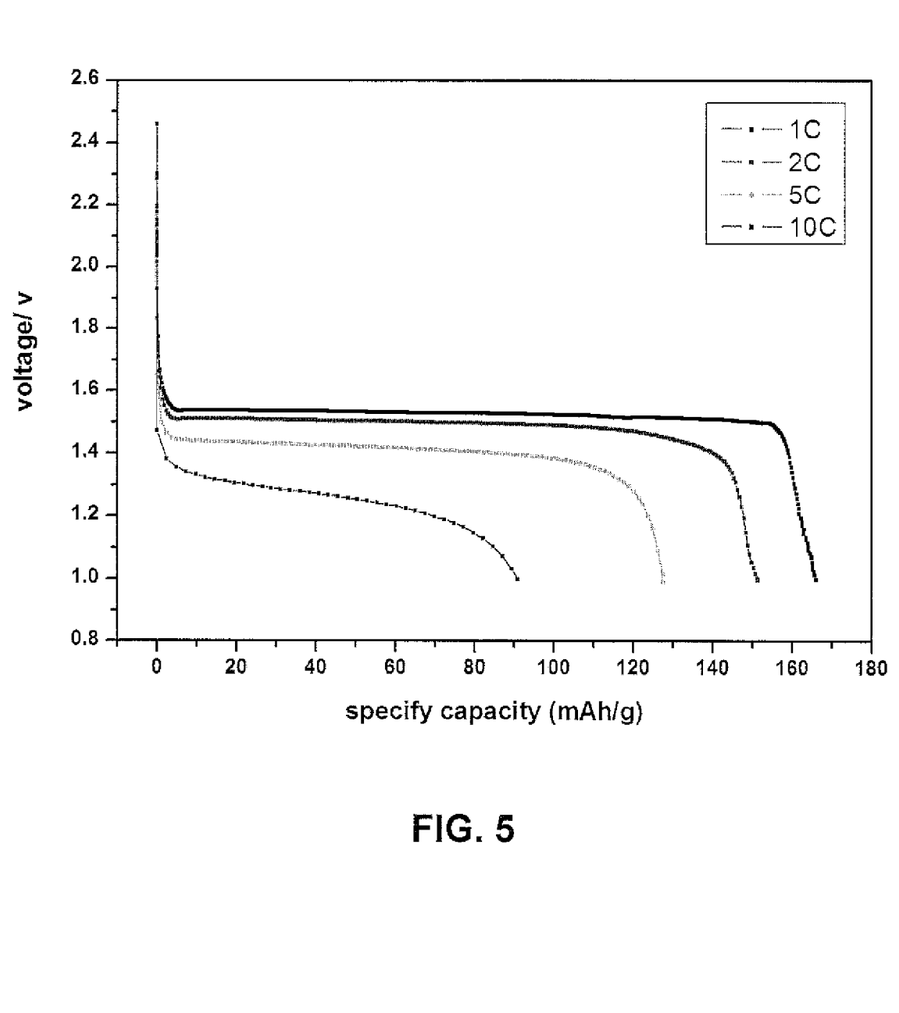
FIG. 5 shows discharge curves at different discharge rates of 1 C, 2 C, 5 C, and 10 C of the lithium titanate electrode material prepared according to Example 1 of the invention.
Figure 6:
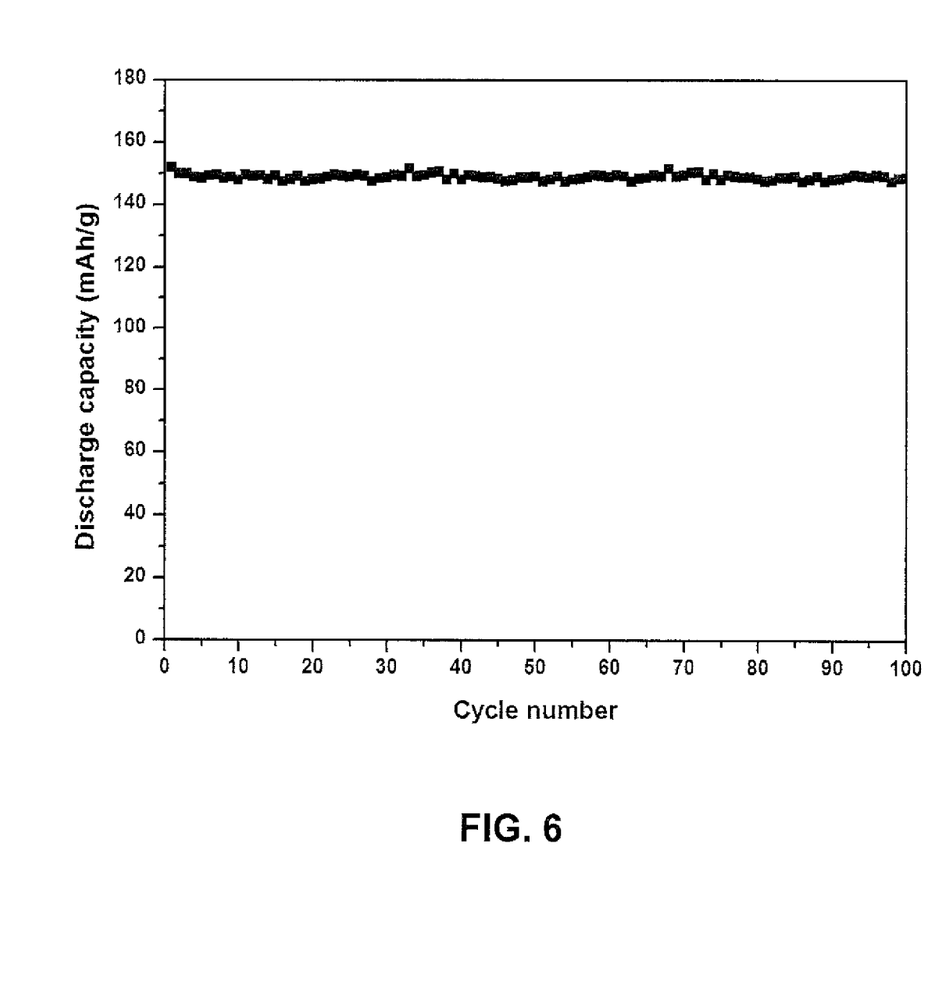
FIG. 6 shows cycle curves of lithium titanate lithium electrode material prepared according to Example 1 of the invention (0.2 C charge and discharge).

Batteries may be assembled using the lithium titanate materials from the above Examples and lithium metal sheet to test their electrical performance. Among these, the charge and discharge curves of lithium titanate materials prepared in Example 1 are shown in FIG. 5. It can be seen that the 1 C discharge capacity of this material is 164.79 mAh/g, the 2 C discharge capacity of this material is 151.46 mAh/g, the 5 C discharge capacity of this material is 127.91 mAh/g, and the 10 C discharge capacity of this material is 90.77 mAh/g, showing a good rate capability. FIG. 6 shows the recycle curves of the material. At 2 C rate after 100 cycles, the material maintains a high discharge capacity, showing a good cycling performance.

From the above examples, it can be seen that lithium titanate anode materials prepared by supercritical continuous hydrothermal synthesis have significantly improved cycle performance properties, as compared with lithium titanate prepared by the conventional method. Among these specific examples, the lithium titanate materials prepared with a molar ratio of Li:Ti-4.2:5 precursor of lithium hydroxide and titanate butyl at a flow rate of 1.7 g/min, and a water flow rate of 9 g/min have superior charge-discharge performance and exhibit excellent electrochemical performance properties. These materials are excellent lithium-ion battery anode materials.

However, the specific parameters in the above examples are for reference only. One skilled in the art would appreciate that optimal parameters may depend on the dimensions of the reactor, the flow rates, the temperatures, and the pressures used in the synthesis. To find the optimal parameters requires only routine experimentation, which is within the common skills in the art, and would not require undue experimentation. Therefore, embodiments of the invention are not limited by these specific examples.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for synthesizing lithium titanate, comprising:
preparing a supercritical fluid from water in a first reactor;
reacting a solution comprising lithium and titanium in the pre-formed supercritical fluid under a condition that maintains the pre-formed supercritical fluid hi its supercritical state to produce a reaction mixture comprising the lithium titanate, wherein the solution comprising lithium and titanium is a premixed solution from a solution containing lithium and a solution containing titanium, wherein the reacting is conducted in a continuous fashion by pumping the solution comprising lithium and titanium and the pre-formed supercritical fluid into a second reactor, wherein a flow rate of water for the supercritical fluid is about 5-25 g/min and a flow rate for the solution is about 1.7-3.0 g/min; and
collecting the lithium titanate.

2. The method of claim 1, wherein the solution comprising lithium is prepared by dissolving a lithium source in a selected solvent different from water, and the solution comprising titanium is prepared by dissolving a titanium source in the selected solvent.

3. The method of claim 2, wherein the selected solvent is an alcohol.

4. The method of claim 2, wherein the lithium source is selected from lithium hydroxide, lithium carbonate, lithium acetate, lithium oxalate, lithium nitrate, lithium oxide, or a combination thereof, and the titanium source is tetrabutyl titanate.

5. The method of claim 2, wherein the solution comprising lithium and the solution comprising titanium are bubbled with an inert gas to remove a dissolved gas.

6. The method of claim 5, wherein the inert gas is nitrogen.

7. The method of claim 1, wherein the water is bubbled with an inert gas to remove a dissolved gas prior to the preparing the supercritical fluid.

8. The method of claim 7, wherein the inert gas is nitrogen.

9. The method of claim 1, further comprising cooling the reaction mixture or allowing the reaction mixture to cool prior to the collecting the lithium titanate.

10. The method of claim 1, wherein the collecting the lithium titanate is by filtration or centrifugation.

11. The method of claim 1, wherein the supercritical fluid is prepared at a temperature in a range of about 375-500° C. and a pressure in a range of about 22-35 MPa.

12. The method of claim 1, wherein the supercritical fluid is prepared at a temperature of about 400° C. and a pressure of about 25 MPa.

13. The method of claim 1, wherein a molar ratio of lithium:titanium in the solution is between about 4.0:5.0 and about 4.5:5.0.

14. The method of claim 1, wherein a molar ratio of lithium:titanium in the solution is between about 4.0:5.0 and about 4.2:5.0.

15. The method of claim 1, wherein a molar ratio of lithium:titanium in the solution is about 4.2:5.0.

16. The method of claim 1, further comprising purifying the collected lithium titanate by:
suspending the collected lithium titanate in water to produce a suspension;
sonicating the suspension; and
centrifuging the suspension to collect purified lithium titanate.

* * * * *